United States Patent
Saxena et al.

(10) Patent No.: US 10,935,783 B1
(45) Date of Patent: Mar. 2, 2021

(54) OPTICAL SYSTEM FOR CAPTURING DIGITAL IMAGES IN AN AQUACULTURE ENVIRONMENT IN SITU

(71) Applicant: Aquabyte, Inc., San Francisco, CA (US)

(72) Inventors: Alok Saxena, San Francisco, CA (US); Vooi Leng Tan, Selangor (MY); Cherng Woei Heng, Negeri Sembilan (MY)

(73) Assignee: Aquabyte, Inc., San Francisco, CA (US)

( * ) Notice: Subject to any disclaimer, the term of this patent is extended or adjusted under 35 U.S.C. 154(b) by 0 days.

(21) Appl. No.: 16/572,935

(22) Filed: Sep. 17, 2019

(51) Int. Cl.
| | |
|---|---|
| *G03B 31/00* | (2021.01) |
| *G02B 27/00* | (2006.01) |
| *H04N 5/225* | (2006.01) |
| *H04N 13/239* | (2018.01) |
| *A01K 29/00* | (2006.01) |
| *G02B 9/12* | (2006.01) |
| *G03B 15/02* | (2021.01) |
| *A01K 63/06* | (2006.01) |
| *G03B 17/08* | (2021.01) |

(52) U.S. Cl.
CPC ........ *G02B 27/0025* (2013.01); *A01K 29/005* (2013.01); *A01K 63/06* (2013.01); *G02B 9/12* (2013.01); *G03B 15/02* (2013.01); *G03B 17/08* (2013.01); *H04N 5/2254* (2013.01); *H04N 5/2256* (2013.01); *H04N 13/239* (2018.05)

(58) Field of Classification Search
CPC .. H04N 5/2254; H04N 5/2256; H04N 13/239; A01K 63/06; A01K 29/005; G02B 27/0025; G02B 9/12; G03B 17/08; G03B 15/02
See application file for complete search history.

(56) References Cited

U.S. PATENT DOCUMENTS

| | | | | |
|---|---|---|---|---|
| 1,535,312 A | * | 4/1925 | Hosking | G03B 17/02 352/242 |
| 2,537,303 A | * | 1/1951 | Cobb, Jr. | A61B 46/10 396/14 |
| 3,036,506 A | * | 5/1962 | Andresen, Jr. | G03B 17/08 396/27 |

(Continued)

FOREIGN PATENT DOCUMENTS

| | | | |
|---|---|---|---|
| EP | 993192 A2 | * | 5/1999 |
| JP | 2010141623 A1 | * | 1/2006 |

OTHER PUBLICATIONS

Knight, David, "Underwater Wide-angle Coverter Lenses", Intro, g3ynh.info/photography/articles/wconv_html, dated 2012, 5 pages.

*Primary Examiner* — Philip P. Dang
(74) *Attorney, Agent, or Firm* — Hickman Becker Bingham Ledesma LLP; Adam C. Stone (57) ABSTRACT

An optical system for immersion underwater in an aquaculture environment. The optical system captures, in situ, digital images of underwater objects such as freely swimming fish such as, for example, sea salmon or sea trout, as the fish swim naturally in the aquaculture environment. The digital images produced by the optical system are of enough quality such that reliable detection of sea lice in different life stages by a human visual inspection of the digital image or by computer vision systems is enabled.

12 Claims, 11 Drawing Sheets

(56) References Cited

U.S. PATENT DOCUMENTS

| | | | | |
|---|---|---|---|---|
| 4,033,392 | A * | 7/1977 | Less | A45C 11/38 206/316.2 |
| 4,071,066 | A * | 1/1978 | Schaeffer | A45C 11/22 206/316.2 |
| 4,176,701 | A * | 12/1979 | Welgan | G03B 17/08 206/316.2 |
| 4,771,299 | A * | 9/1988 | Gell, Jr. | G03B 17/08 114/312 |
| 5,056,903 | A * | 10/1991 | Nakamura | G03B 17/08 359/513 |
| 5,159,366 | A * | 10/1992 | Gell, Jr. | G03B 17/08 206/811 |
| 5,742,850 | A * | 4/1998 | Nomura | G02B 7/08 396/72 |
| 5,793,537 | A * | 8/1998 | Nomura | G02B 7/08 359/700 |
| 5,892,999 | A * | 4/1999 | Nomura | G02B 7/08 396/462 |
| 6,686,988 | B1 * | 2/2004 | Sugawara | G02B 30/24 355/22 |
| 6,833,966 | B2 * | 12/2004 | Nishioka | G02B 3/14 359/726 |
| 7,106,959 | B2 * | 9/2006 | Sato | H04N 5/2252 396/27 |
| 7,430,079 | B2 * | 9/2008 | Watanabe | G02B 15/144113 359/687 |
| 7,453,647 | B2 * | 11/2008 | Take | G02B 15/177 359/676 |
| 7,630,142 | B2 * | 12/2009 | Nishimura | G02B 15/144113 359/687 |
| 7,653,291 | B2 * | 1/2010 | Yeom | A45C 11/38 396/27 |
| 7,675,688 | B2 * | 3/2010 | Shimada | G02B 15/143507 359/680 |
| 8,270,824 | B2 * | 9/2012 | Nishimura | G03B 3/10 396/79 |
| 8,878,986 | B2 * | 11/2014 | Zou | H04N 5/2252 348/373 |
| 8,905,610 | B2 * | 12/2014 | Coleman | G02B 6/0076 362/554 |
| 9,931,023 | B2 * | 4/2018 | Shahinian | A61B 1/05 |
| 10,191,241 | B2 * | 1/2019 | Kobori | H04N 5/2254 |
| 10,271,003 | B2 * | 4/2019 | Totani | G02B 27/0176 |
| 10,422,944 | B2 * | 9/2019 | Yuan | G02B 6/0018 |
| 2005/0115852 | A1 * | 6/2005 | Funahashi | G03B 17/08 206/316.2 |
| 2010/0293831 | A1 * | 11/2010 | Hreinsson | A01K 79/02 43/4.5 |
| 2013/0223827 | A1 * | 8/2013 | Enomoto | G03B 17/08 396/25 |
| 2013/0223828 | A1 * | 8/2013 | Enomoto | G03B 17/08 396/27 |
| 2013/0236166 | A1 * | 9/2013 | Enomoto | G03B 17/08 396/25 |
| 2017/0078645 | A1 * | 3/2017 | Aurigema | B63C 11/12 |
| 2019/0323663 | A1 * | 10/2019 | Rudy | F21V 29/70 |
| 2020/0134849 | A1 * | 4/2020 | Blasco Claret | G06T 7/593 |

\* cited by examiner

| Left Surface | Material | Right Surface |
|---|---|---|
| R 76.9497 CX | CLASS: H-ZF4A | R 440.498 CC |
| 0t: 49.942 | Nd = 1.728654 | 0t: 46.627 |
| 0/ Anti-reflection 480-640nm | Vd = 28.31 | 0/ Anti-reflection 480-640nm |
| 3/ @ 0.6328 μm | 0/ - | 3/ @ 0.6328 μm |
| 4/ - | 1/ - | 4/ - |
| 5/ - | 2/ - | 5/ - |
| 6/ - | | 6/ - |

FIG. 7B

OPTICAL SYSTEM FOR CAPTURING DIGITAL IMAGES IN AN AQUACULTURE ENVIRONMENT IN SITU

TECHNICAL FIELD

The present disclosure generally relates to underwater optical systems for capturing digital images of fish and other underwater objects in an aquaculture environment.

BACKGROUND

The growth rate of world human population is applying substantial pressure on the planet's natural food resources. Aquaculture will play a significant part in feeding this growing human population.

Aquaculture is the farming of aquatic organisms (fish) in both coastal and inland areas involving interventions in the rearing process to enhance production. Aquaculture has experienced dramatic growth in recent years. The United Nations Food and Agriculture Organization estimates that aquaculture now accounts for half of the world's fish that is used for food.

Fish farm production technology is underdeveloped, when compared to the state of the art in other food production processes. Techniques that improve the production processes in fish farms using new perception and prediction techniques would be appreciated by fish farmers.

Sea lice on sea salmon and sea trout farmed in the open ocean represent one of the biggest challenges to fish health in the aquaculture industry. Sea lice is a natural parasite of salmon and trout in saltwater and are found in sea waters of the northern hemisphere. Sea lice damage salmon and trout by feeding on their mucous, skin, and blood. If sea lice become too prevalent in a fish farm, they can cause sores and other damage to the fish, laying them open to infection.

As a matter of food safety, governmental regulations covering aquaculture may impose an average per-fish limit on the number of sea lice. For example, Norwegian regulations specify for certain circumstances that there must be fewer than 0.5 adult female lice per fish on average in an aquaculture facility. The limit can vary depending on the season and geographic location of the farm. The fish farmer is responsible for keeping the numbers below the limit. Non-compliance may result in forced destruction of the fish stock.

Traditional techniques to count the number of sea lice are manual. However, minimizing the handling of fish is highly desirable not just because it is human-labor intensive but also because manual handling impacts the health of the fish. As such, less-manual techniques are preferred.

Embodiments disclosed herein address these and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

DETAILED DESCRIPTION

In the following description, for the purposes of explanation, numerous specific details are set forth in order to provide a thorough understanding of embodiments of the present invention. It will be apparent, however, that an implementation may be practiced without these specific details. In other instances, some structures and devices are shown in block diagram form in order to avoid unnecessarily obscuring an embodiment.

Fish farmers and aquaculture operators would appreciate technology that helps them detect, count, and classify sea lice on fish.

Optical System

Disclosed is an optical system for immersion underwater in an aquaculture environment. The optical system captures, in situ, digital images of underwater objects such as freely swimming fish such as, for example, sea salmon or sea trout, as the fish swim naturally in the aquaculture environment. The digital images produced by the optical system are of enough quality such that reliable detection of sea lice in different life stages by a human visual inspection of the digital image or by computer vision systems is enabled.

The optical system can capture enough quality digital images in a range of different imaging conditions such that gathering accurate per-fish and per-population sea lice counts is possible on a daily basis throughout the farming season.

When immersed in the aquaculture environment, the optical system can capture enough quality images of fish up to a working distance from the system.

A spatial frequency response of the optical system has an underwater modulation transfer function (MTF) value in the range of approximately 0.3 to 0.4 at a spatial frequency of 150-200-line pairs per millimeter (lpmm) for a given dark and light wavelength pair. As a result, when immersed underwater in the aquaculture environment, the optical system or a human can optically resolve sea lice as small as approximately one (1) millimeter on fish located up to approximately one and one-half meters (1) working distance underwater from the system.

The optical system encompasses multiple lenses optimized for imaging fish in an aquaculture environment. The lenses have a large field of view as well as high resolution. As a result, the optical system can capture a sharp image of multiple full fish bodies swimming near the optical system in the aquaculture environment.

In some embodiments of the optical system, there are three lenses arranged in series and the first outermost lens has a field of view of approximately seventy-four (74) degrees horizontal.

In some embodiments of the optical system, the optical system includes external lighting components and a lens filter system to produce digital images with enough color contrast for detecting sea lice on fish in a variety of different environmental conditions including under different natural lighting conditions (e.g., day or low-light) and different turbidity levels. At the same time, the external lighting components do not impact the health of the fish in the aquaculture environment as other lighting systems do.

Lens System

The multiple-lens system may include multiple glass-based lens elements. The lenses may be encased in series in a waterproof barrel that maintains the lenses in fixed positions relative to each other in the barrel.

The multiple-lens system may be designed specifically to achieve a high underwater MTF value. A spatial frequency response of the multiple-lens system may have an underwater MTF value of approximately 0.8 at approximately 70 lpmm for a given dark and light wavelength pair enough to resolve an approximately 1 millimeter in length sea lice on a fish at approximately 1 meter working distance from the lens system.

A spatial frequency response of the lens system may also have an underwater MTF value of approximately 0.4 at approximately 150 lpmm for a given dark and light wavelength pair enough to resolve an approximately 1 millimeter in length sea lice on a fish at approximately 1 meter working distance from the lens system. As a result, the lens system can achieve a enough resolution and sharpness to resolve sea lice at all three life stages on fish at a reasonable working distance from the lens system.

The underwater MTF of the lens system only slightly degrades as the angle of incidence varies. This allows for sufficiently high resolution of captured digital images in all parts of the image where fish may appear.

A characteristic of the lens system may be a robust depth of focus. As a result, the image quality degrades only slightly as fish swim away from an optimal working distance of approximately 1 meter. In some embodiments of the lens system, the depth of focus for the outermost lens is f/5.6.

In some embodiments of the lens system, the lens system may be designed to maintain a relatively high field of view of approximately fifty-five (55) degrees in sea water. This allows capturing digital images of full fish bodies as opposed to only partial fish bodies and enables accurate per-fish sea lice counts and well as accurate per-population sea lice counts.

Lighting System

The optical system can improve the ability to detect sea lice in captured digital images, either by human visual inspection or by computer vision systems, by enhancing the contrast of sea lice against the surrounding fish skin surface. The inventors have determined through their own research on the spectral characteristics of sea lice underwater that sea lice become significantly absorbent relative to surrounding fish skin when illuminated with white light in the 450 to 500 nanometer range. Based on this, the external lighting system of the optical system may include one or more external lighting elements such as, for example, one or more light emitting diode (LED) lights.

The lights may be positioned externally on the lens system enclosure at selected positions and orientations to illuminate entire fish bodies in a substantially uniform manner. Each of the LED lights may be capable of constantly emitting approximately 6,000 to 10,000 lumens of white light with an approximately 75-degree beam angle. The light emitted from the LED lights may have a spectral peak in the approximately 450 to 500 nanometer range to maximize the contrast between sea lice and fish skin.

The power of the LED lights may be enough to capture sufficiently bright digital images in relatively low light conditions such as might be present during winter months or at deep underwater depths. Further, because the LED lights may constantly emit light, strobing the lights may not be necessary, which can have negative health impacts on the fish.

In some embodiments of the lighting system, the LED lights may be dimmable such that that light intensity may be adjusted, or the lights turned off completely to prevent unwanted side-effects on the health of the fish. For example, the LED lights may be dimmed or turned off to prevent alteration of the timing of sexual maturation of the fish, prevent change in fish appetite levels, and prevent change in behavioral patterns of the fish that might otherwise be caused by the lighting. In some embodiments of the lighting system, the LED lights are coupled to and remotely controllable via an Internet Protocol (IP) network.

Filter System

In some embodiments of the optical system, the optical system includes a lens filter system. The lens filter system may include a pass filter affixed to the front of the lens system. The pass filter may be designed to cut out all incoming wavelengths above 550 nanometers. This may further enhance the visible contrast of the sea lice against the fish skin in the captured digital images.

The pass filter may also include an absorptive linear polarizer that eliminates undesirable specular reflections off of the fish scales, which may further improve the image quality and contrast of the sea lice against the fish skin in the captured digital images.

Use of a pass filter can be helpful because of the lighting system. The lighting system can result in undesirable specular reflections. As such, the polarizers affixed to each lens barrel of the optical system can be rotated at an angle such that they optimally filter out specular reflections given that the two LED lights are positioned on either side of the optical system along the horizontal axis.

Example Aquaculture Environment

Figure 1:
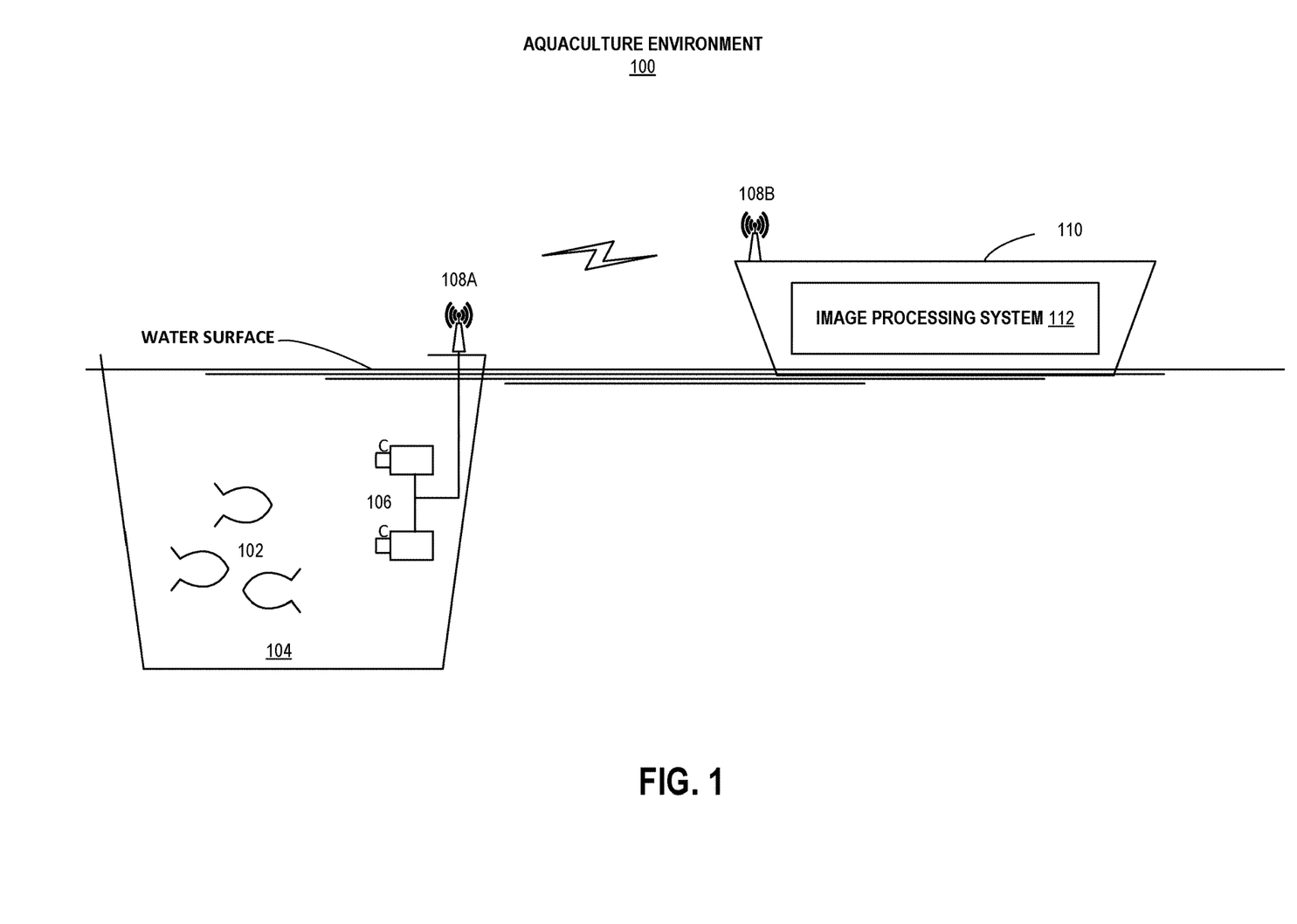
FIG. 1 depicts an example aquaculture environment for the optical system, according to some embodiments of the present invention.

FIG. 1 illustrates example aquaculture environment 100 for detecting sea lice on freely swimming fish 102 in fish farm enclosure 104, according to some embodiments of the present invention. The system 100 includes optical system 106 within a waterproof housing immersed underwater in fish farm enclosure 104.

In this example, optical system 106 is a stereo digital camera system having two lens systems for capturing stereo digital images of fish 102. The stereo digital images may be processed by an image processing system to obtain three-dimensional coordinates for objects (e.g., fish and sea lice) detected in the digital images. The three-dimensional coordinates may be used to determine the actual real-world sizes (e.g., width, height, and length) of the objects.

While in some embodiment of optical system 106, optical system 106 is a stereo camera system with two lens systems for capturing stereo digital images of fish 102, an optical system has just a single lens system in other embodiment of optical system 106.

In some embodiments of optical system 106, optical system 106 captures monochrome or color digital images with a resolution of approximately 4096 pixels by 3000 pixels, and at a frame rate of approximately 1 to 8 frames per second.

Lens selection of optical system 106 may be based on an appropriate baseline and focal length to capture digital images of fish 102 swimming in front of optical system 160 where the fish is close enough to the lens for proper pixel resolution and feature detection in the captured digital images, but far enough away from the lens such that the entire fish can fit in both the left and right frames. For example, 8-millimeter focal length lenses with high line pair count (lp/mm) can be used such that each of the pixels in the left and right digital images can be resolved. The baseline of optical system 106 may have greater variance such as, for example, within the range of 6 to 12-centimeter baseline.

Fish farm enclosure 104 may be a sea net pen framed by a plastic or steel cage that provides a substantially inverted conical, circular, or rectangular cage, or cage of other desired dimensions. Fish farm enclosure 104 may hold fish of a particular type (e.g., sea salmon or sea trout) depending on various factors such as the size of fish farm enclosure 104 and the maximum stocking density of the particular fish caged. For example, a net pen for salmon may be 50 meters in diameter, 20-50 meters deep, and hold up to approximately 200,000 salmon assuming a maximum stocking density of 10 to 25 kg/m3.

While in some embodiments of the present invention, optical system 106 is used in a sea-pen environment, optical system 106 may be used in other fish farming enclosures in other embodiments of the present invention. For example, optical system 106 may be used in fish farm ponds, tanks, or other like fish farm enclosures.

Optical system 106 may be attached to a winch system that allows the optical system 106 to be relocated underwater in fish farm enclosure 104 to capture digital images of freely swimming fish from different locations within fish farm enclosure 104. For example, the winch system may allow optical system 106 to move around the perimeter and the interior of fish farm enclosure 104 and at various depths within fish farm enclosure 104 to capture digital images of sea lice on both lateral sides of fish 102. The winch system may also allow control of pan and tilt of optical system 106.

The winch system may be operated manually by a human controller such as, for example, by directing user input to an above-water surface winch control system. Alternatively, the winch system may operate autonomously according to a winch control program configured to adjust the location of optical system 106 within fish farm enclosure 104, for example, in terms of location on the perimeter of the cage and depth within fish farm enclosure 104.

The autonomous winch control system may adjust the location of optical system 106 according to a series of predefined or pre-programmed adjustments and/or according to detected signals in fish farm enclosure 104 that indicate better or more optimal locations for capturing digital images of fish 102 relative to a current position and/or orientation of optical system 106. A variety of signals may be used such as, for example, machine learning and computer vision techniques applied to digital images captured by optical system 106 to detect schools or clusters of fish currently distant from optical system 106 such that a location that is closer to the school or cluster can be determined and the location, tilt, and/or pan of optical system 106 adjusted to capture more suitable digital images of the fish. The same techniques may be used to automatically determine that optical system 106 should remain or linger in a current location and/or orientation because optical system 106 is currently in a good position to capture suitable digital images of fish 102 for sea lice detection and classification.

As mentioned, optical system 106 may include external lighting components to illuminate the fish 102 in fish farm enclosure 104 with ambient lighting in the blue-green spectrum (e.g., approximately 450 nm to 500 nm). This is useful to increase the length of the daily sample period during which useful digital images of fish 102 in fish farm enclosure 104 may be captured. For example, depending on the current season (e.g., winter), time of day (e.g., sunrise or sunset), and latitude of fish farm enclosure 104, only a few hours during the middle of the day may be suitable for capturing useful digital images without using ambient lighting. This daily period may be extended with ambient lighting.

Fish farm enclosure 104 may be configured with wireless cage access point 108A for transmitting digital images captured by optical system 106 and other information wirelessly to barge 110 or other water vessel that is also configured with wireless access point 108B. Barge 110 may be where on-site fish farming process control, production, and planning activities are conducted. Barge 110 may house computer digital image processing system 112.

In general, computer image processing system 112 may be configured to automatically generate accurate per-fish and per-population sea lice statistics for fish 102 in the fish farm enclosure 104 using computer vision and artificial intelligence techniques applied to digital images captured by optical system 106. The output statistics of image processing unit 112 may be uploaded to the cloud or otherwise over the Internet via a cellular data network, satellite data network, or other suitable data network to an online service configured to provide the estimates or information derived by the online service therefrom in a web dashboard or the like (e.g., in a web browser, a mobile application, a client application, or other client-side computer graphical user interface.)

While in some embodiments of the present invention, optical system 106 is communicatively coupled to image processing system 112 wirelessly via wireless access points 108, optical system 106 is communicatively coupled to image processing system 112 by wire such as, for example, via a wired fiber connection between fish farm enclosure 104 and barge 110 in other embodiments of the present invention.

While in some embodiments of the present invention image processing system 112 is located remotely from optical system 106 and are connected by wire or coupled wirelessly, image processing system 112 is a component of optical system 106 in other embodiments of the present invention. In this configuration, optical system 106 may be configured within an on-board graphics processing unit (GPU) or other on-board processor or processors capable of executing image processing system 112. In this configuration, digital images captured by optical system 106 and/or other information derived from digital images by image processing system 112 (e.g., daily sea lice counts) may be transmitted directly from optical system 106/image processing system 112 to an off-site data center or other data processing facility bypassing barge 110. Thus, environment 100 does not require barge 110 or other on-site location for hosting image processing system 112.

Example Sea Lice Life Stages

Figure 2:
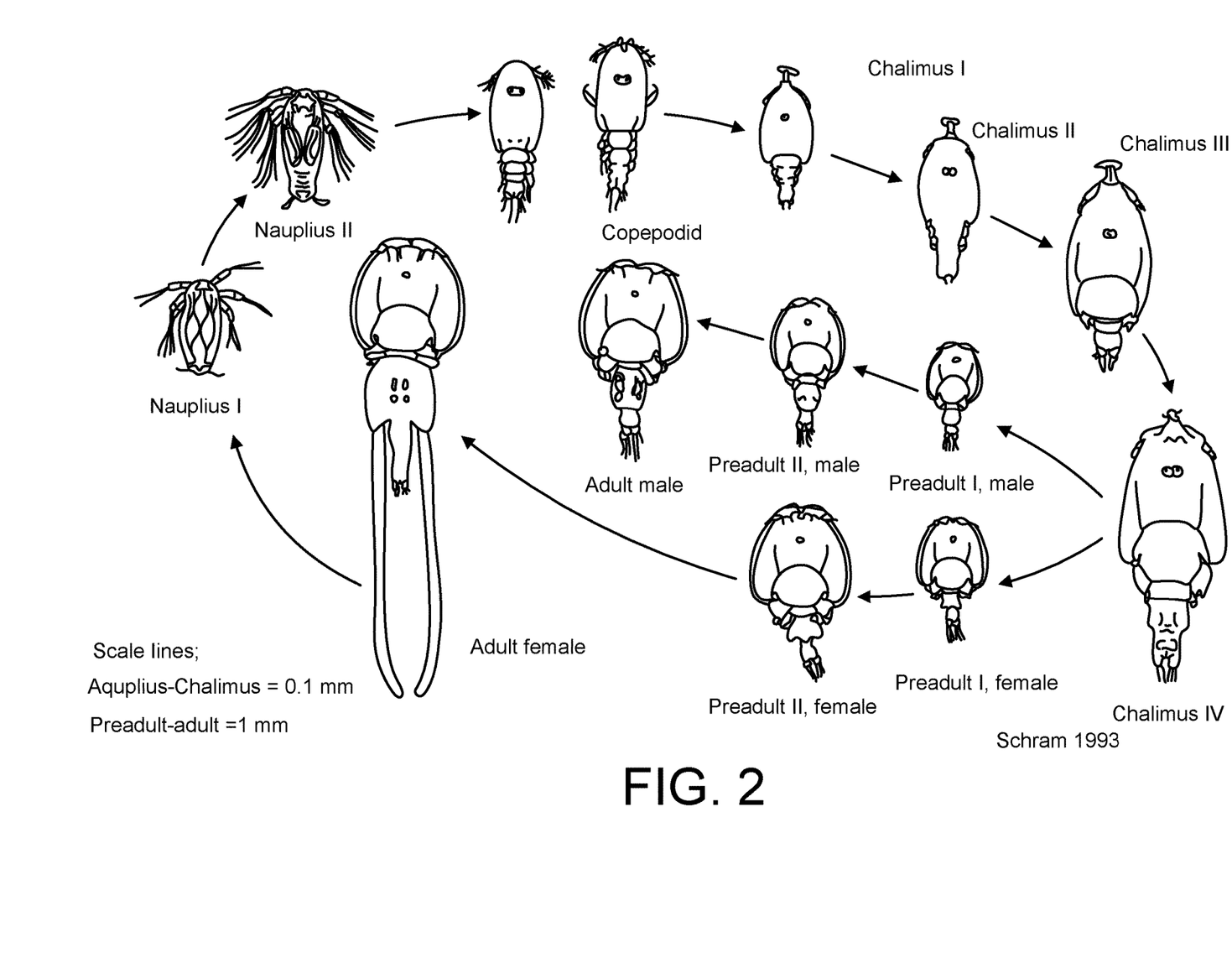
FIG. 2 shows the different life stages and the life cycle of a particular sea lice species the *Lepeophtheirus salmonis*.

FIG. 2 depicts various life stages and life cycle of the *Lepeophtheirus salmonis* species of sea lice. In some embodiments of the present invention, the optical system is used to detect the *Lepeophtheirus salmonis* on the skin of sea salmon farmed in an aquaculture environment in all of the different life stages described below. However, the optical system may be used to detect other small skin parasites of fish such as, for example, other species of the *lepeophtheirus* such as, for example, *Lepeophtheirus pectoralis*.

The general stages of the *Lepeophtheirus salmonis* species from earliest to latest are: nauplius, copepodid, chalimus, pre-adult, and adult. During the nauplius stages, sea lice are small free-floating larvae approximately 0.7 millimeters in length and do not attach to fish.

During the copepodid stage, the sea lice attach to fish and become parasites. Their size during the copepodid stage is approximately 0.7 to 0.8 millimeters in length.

During the chalimus stages, the sea lice generally remain attached to the fish. During the chalimus stages, the sea lice may grow between approximately 1.1 millimeters to 2.3 millimeters in length.

During the pre-adult phases, male and female sea lice are distinguishable by their respective shapes, with males having a generally barrel shape outline when viewed top-down and females having a generally triangular shape outline from the same perspective. As pre-adults, male and female sea lice have an approximately mean length of 3.6 millimeters.

During the adult stage, the female sea lice are fertile. As mentioned, governmental regulations in some countries (e.g., Norway) put legal limits on the average number of sea lice per fish in a fish farm. For example, in Norway, the legal limit is set to 0.5 adult females per fish on average, without or without egg strings. During some parts of the year depending on the latitudinal location of the fish farm, the legal limit is lowered to 0.2.

The size in length of adult female sea lice generally ranges between 8 and 12 millimeters or more including egg strings. Adult females are visibly distinguishable from adult males and pre-adults by their egg strings or their total lateral length. Adult males are typically between 5 to 6 millimeters in length while adult females are typically between 8 to 12 millimeters in length or more.

External Views

Figure 3A:
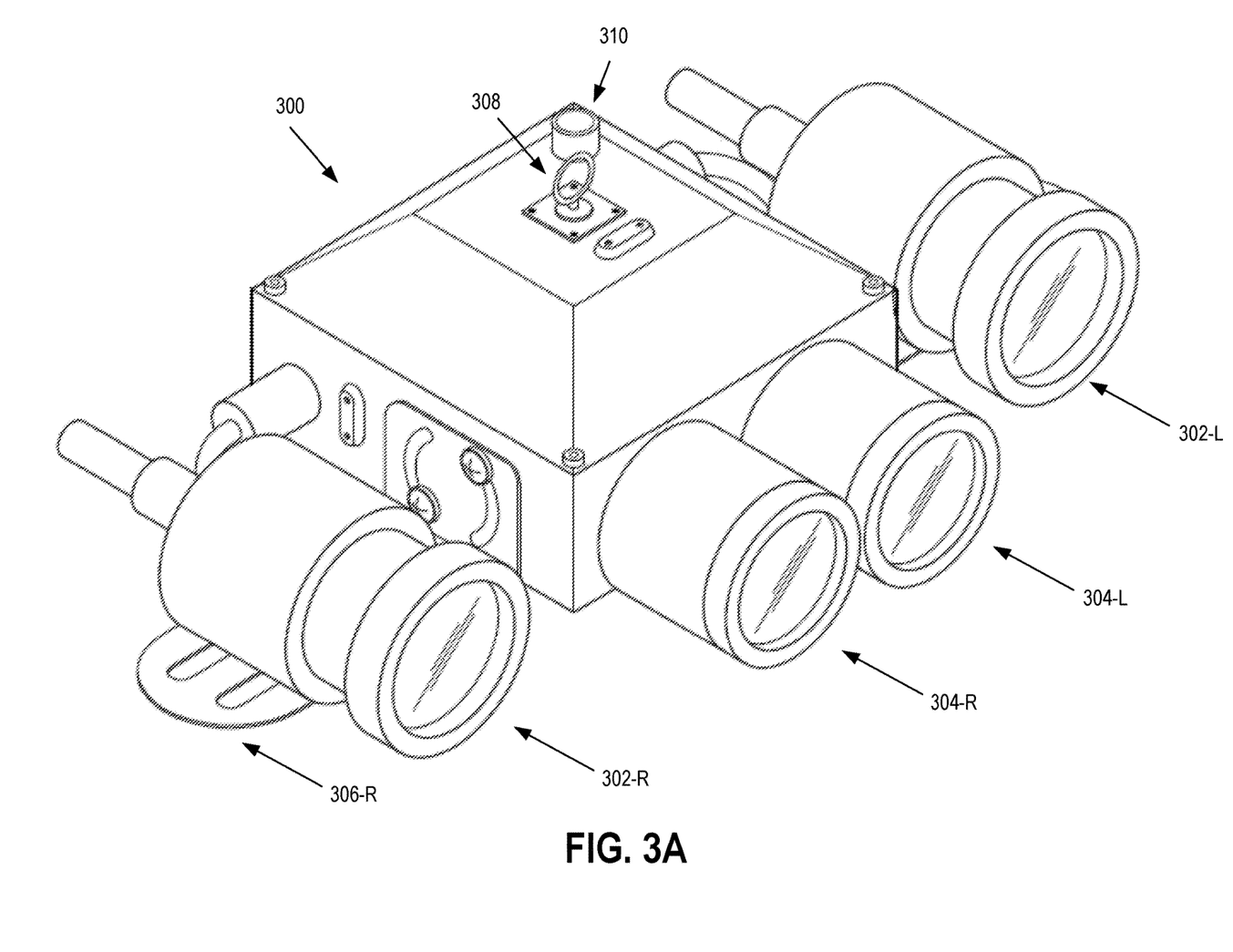
FIG. 3A shows an oblique external view of the optical system, according to some embodiments of the present invention.

FIG. 3A shows an oblique external view of the optical system, according to some embodiments of the present invention. The optical system has housing 300, left lighting element 302-L, left lens barrel 304-L, right lens barrel 304-R, and right lighting element 302-R. Here, left and right is defined relative to a plane parallel with lens barrels 304 in the direction of the object being captured or filmed.

All of housing 300, lighting elements 302, and lens barrels 304 may be waterproof up to an underwater depth of at least 50 to 75 meters depth.

The lighting elements 302 may be each fastened to a respective L-shaped bracket (e.g., 306-R) that may be fastened to housing 300. The L-shaped bracket may allow the respective lighting element to be positioned differently. In particular, the L-shaped bracket may allow positioning of the respective lighting element along a lateral axis and along a rotational axis to achieve different angles of reflection by light emitted by lighting elements 302 that reflects off of objects and back to the front of lens barrels 304.

The lateral axis of the L-shaped bracket may be substantially parallel with a plane parallel to lens barrels 304. The lateral axis capability of the L-shaped bracket may be provided by two parallel track elements that allow the respective lighting element to be positioned closer to housing 300 or farther away from housing 300 along the lateral axis. Two screws or bolts affixed to the attached lighting element insert through the track elements and nuts or other suitable fasteners may be used to secure the respective lighting element at a selected position along the lateral axis.

The rotational axis capability of L-shaped bracket may be provided by two semi-circular track elements that allows the L-shaped bracket to be rotated along a fixed axis to at least a 45-degree angle above or below a plane parallel with lens barrels 304. The selected angle may be secured in position with screws that insert through the semi-circular track elements into fixed position screw wells in the side of housing 300.

Connector 308 may allow housing 300 to be coupled to a winch control system such as that described above.

Power connector 310 may allow an electrical power supply to be connected to housing 300 and the electronic components encased therein.

Figure 3B:
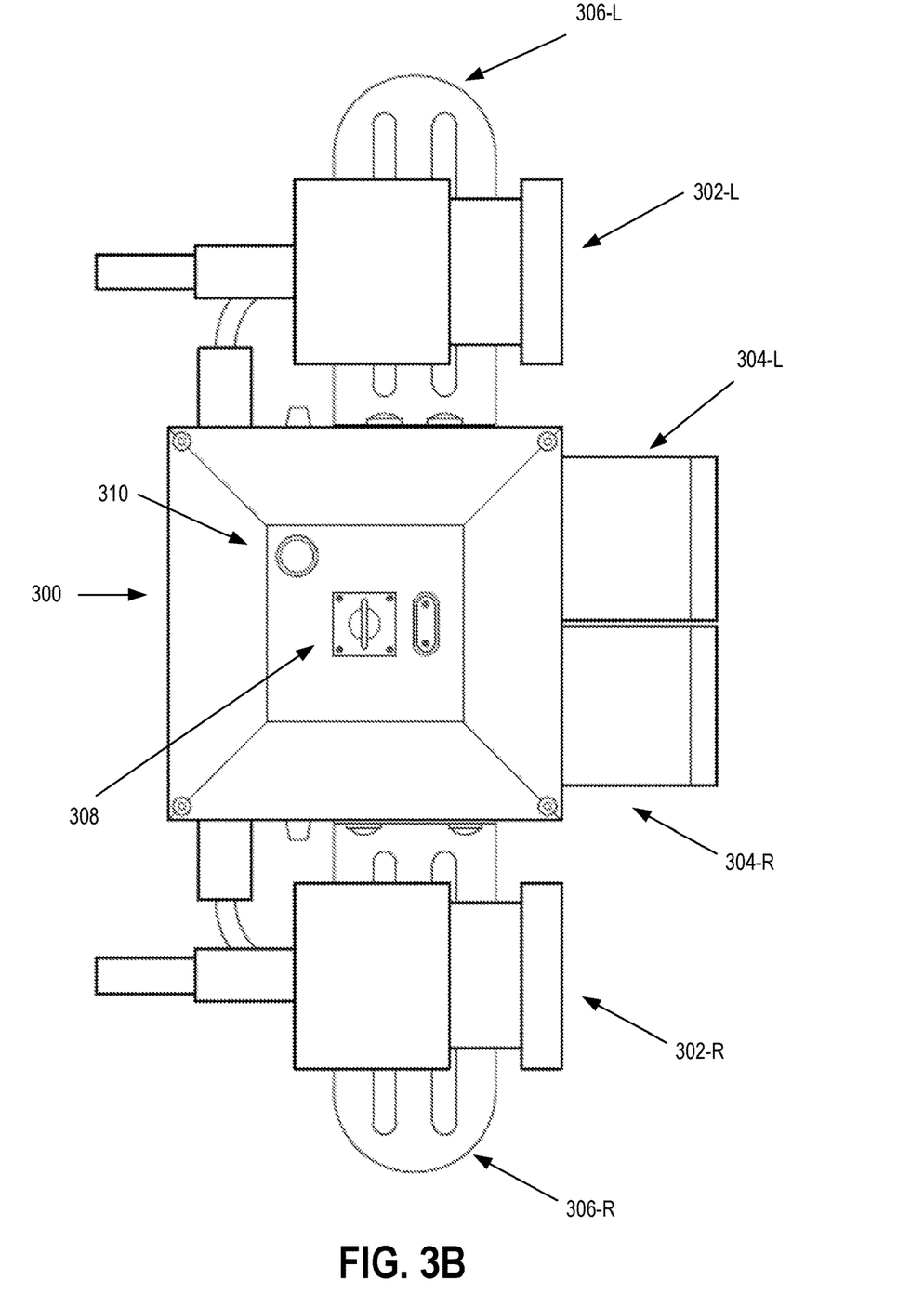
FIG. 3B shows a top-down external view of the optical system, according to some embodiments of the present invention.

FIG. 3B shows a top-down external view of optical system shown in FIG. 3A. In this view, left L-shaped bracket 306-L is visible.

Lens Barrel Configuration

Figure 4:
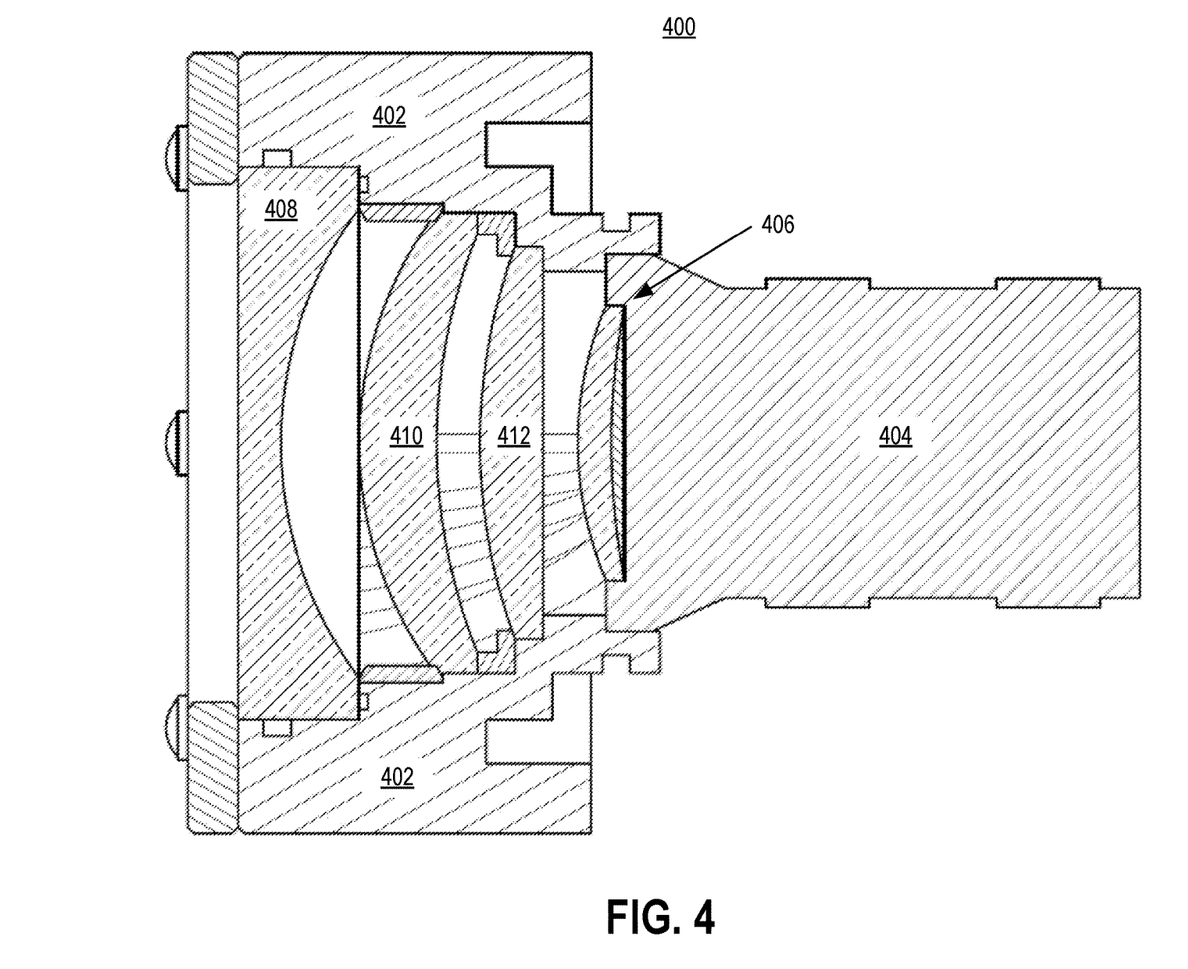
FIG. 4 shows a cross-sectional view of a lens barrel of the optical system, according to some embodiments of the present invention.

In a stereo camera, each of the two lens barrels of the optical system may contain a series of multiple lens elements. FIG. 4 provides a cross-sectional view of a lens barrel 400 of the optical system, according to some embodiments of the present invention. If the optical system is a stereo camera system, then the optical system can have two such lens barrels as shown in FIG. 3A and FIG. 3B.

Lens barrel 400 may include conventional terrestrial digital camera system 404 with conventional terrestrial lens 406. Terrestrial lens 406 can have an eight (8), twelve (12), sixteen (16), eighteen (18), or twenty-two (22) millimeter focal length, for example. Terrestrial lens 406 may be optimized to correct for optical aberrations that result from the refractive index of air (approximately 1.0). Affixed to terrestrial digital camera system 404 may be waterproof (e.g., up to 50 to 75 meters depth underwater) corrector port 402 that contains, in series, in front of terrestrial lens 406, outermost first lens 408 providing a large field of view, followed in the series by first underwater aberration corrector lens 410, which is followed in the series by second underwater aberration corrector lens 412.

Outermost first lens 408 is "outermost" in the sense that it is farthest away from terrestrial lens 406 along an axis from terrestrial lens 406 to outermost first lens 408 among lenses 408, 410, and 412. Second underwater aberration corrector lens 412 is nearest to terrestrial lens 406 along that axis. And first underwater aberration corrector lens 410 is in between outermost first lens 408 and second underwater aberration corrector lens 412 along that axis.

In some embodiments of terrestrial digital camera system 404, terrestrial camera system 404 has a box housing with a housing size of approximately 50 millimeters in length, 40 millimeters in width, and 30 millimeters in height. The housing supports a C-type lens mount.

In some embodiments of terrestrial digital camera system 404, the sensor of terrestrial digital camera system 404 is a CMOS type, the sensor size is approximately 14.1 millimeters by 10.3 millimeters, the sensor resolution is approximately 4,096 pixels by 3,000 pixels, the sensor resolution is approximate 12 megapixels, the sensor frame rate is approximately 8 frames-per-second, and the sensor is a color sensor.

Outermost first lens 408 provides a large field of view. In some embodiments of outermost first lens 408, the large field of view is at least approximately 74 degrees so that the whole lateral side of multiple fish swimming in front of the optical system can be captured in a single image captured by the optical system.

Underwater aberration corrector lens 410 and lens 412 may be field curvature correction lenses for correcting for optical aberrations that result from the refractive index of seawater (approximately 1.3) while also supporting the large field of view of the outermost first lens 408. In contrast, a terrestrial lens may be optimized for correcting for optical aberrations that result from the refractive index of air (approximately 1.0).

The design and configuration lenses 410 and 412 within corrector port 402 may correct for optical aberrations that result from the refractive index of water (approximately 1.3) while at the same time support a large field of view of lens 408. The number of lens elements can be determined through a series of optical simulations by assessing aberration correction with different numbers of lens elements. In some embodiments of the present invention, three lens elements as depicted in FIG. 4 provides a practical balance between all of large field of view, underwater aberration correction, and unit production cost.

In some embodiments of the present invention, outermost lens element 408 is a double concave negative lens primarily used to enlarge the field of view. A negative lens can be used as outermost lens element 408 to enlarge or compensate for the impact that imaging in seawater has on shrinking the field of view. Instead of a double concave negative lens, it is also possible to use a negative meniscus lens as outermost lens element 408. However, to prevent scratching and damage to the front surface of outermost lens element 408, a double concave negative lens may be used where the front surface has a shallow concave to prevent scratching and damage that might otherwise result if the front surface protruded out closer to or beyond the front edge of corrector port 408 as might occur if a negative meniscus lens is used as outermost lens element 408.

Each of underwater aberration corrector lenses 410 and 412 may be a positive meniscus lens primarily designed to reduce optical aberration resulting from imaging in seawater.

Figure 5A:
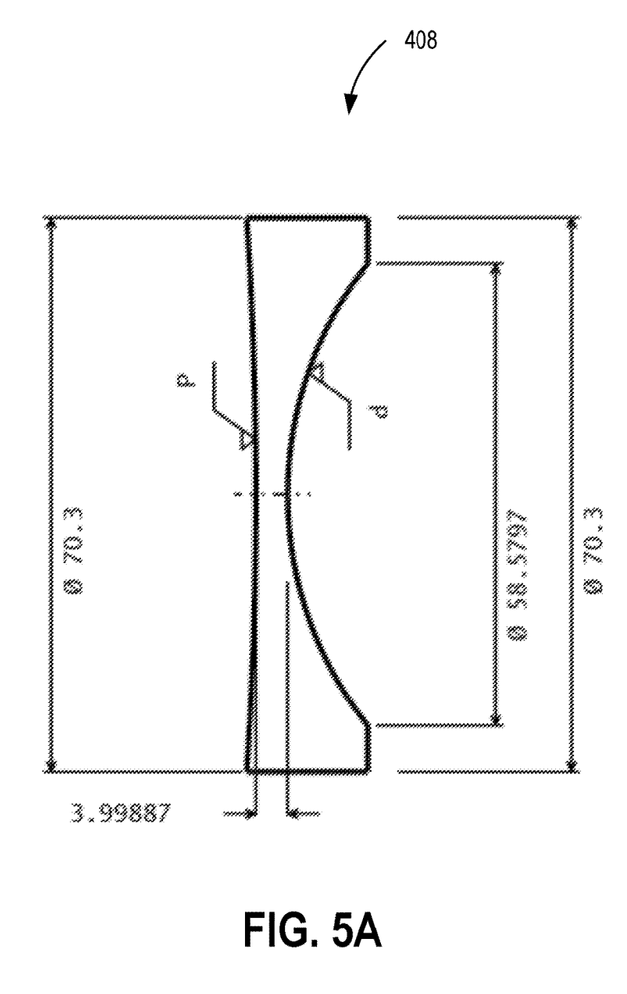
FIG. 5A depicts an outermost lens element of the lens barrel with element drawing indications in accordance with ISO 10110, according to some embodiments of the present invention.

FIG. 5A depicts outermost first lens element 408 of FIG. 4 with element drawing indications in accordance with ISO 10110, according to some embodiments of the present invention. The dimensions shown are in millimeters.

Figure 5B:
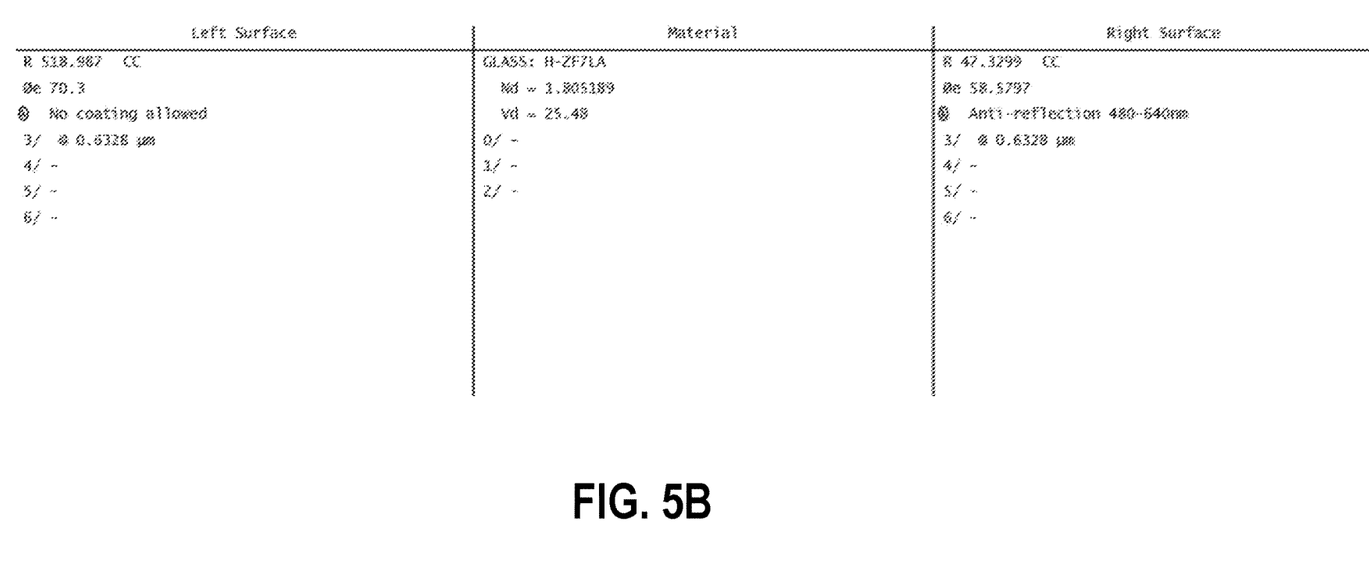
FIG. 5B depicts the left surface, material, and right surface specifications for the outermost lens element in accordance with ISO 10110, according to some embodiments of the present invention.

FIG. 5B depicts the left surface, material, and right surface specifications for outermost first lens element 408 of FIG. 4 and FIG. 5A in accordance with ISO 10110, according to some embodiments of the present invention.

Figure 6A:
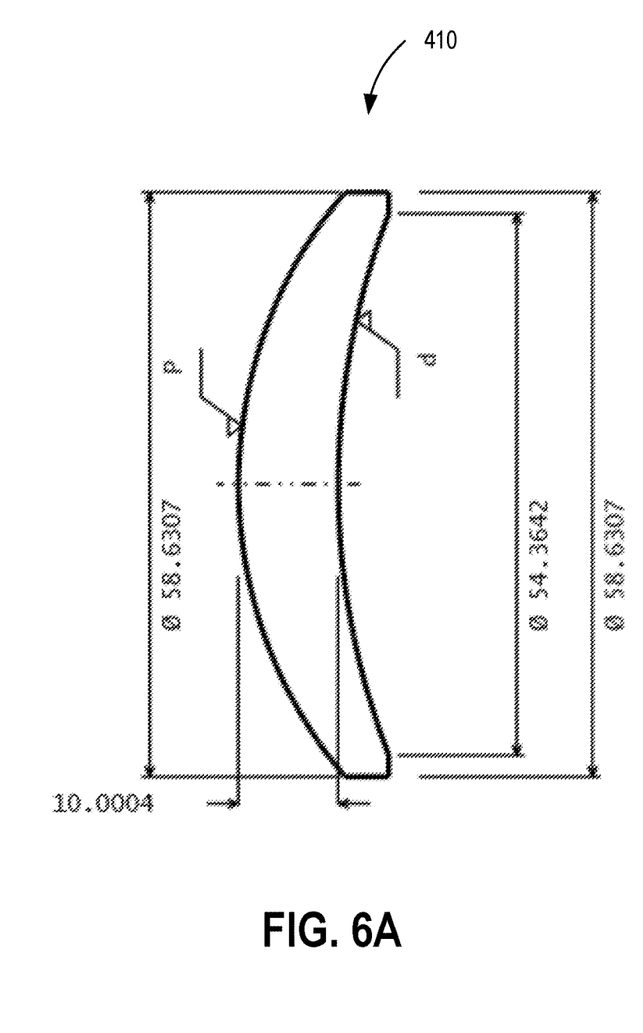
FIG. 6A depicts a first underwater aberration corrector lens of the lens barrel with element drawing indications in accordance with ISO 10110, according to some embodiments of the present invention.

FIG. 6A depicts first underwater aberration corrector lens 410 of FIG. 4 with element drawing indications in accordance with ISO 10110, according to some embodiments of the present invention. The dimensions shown are in millimeters.

Figure 6B:
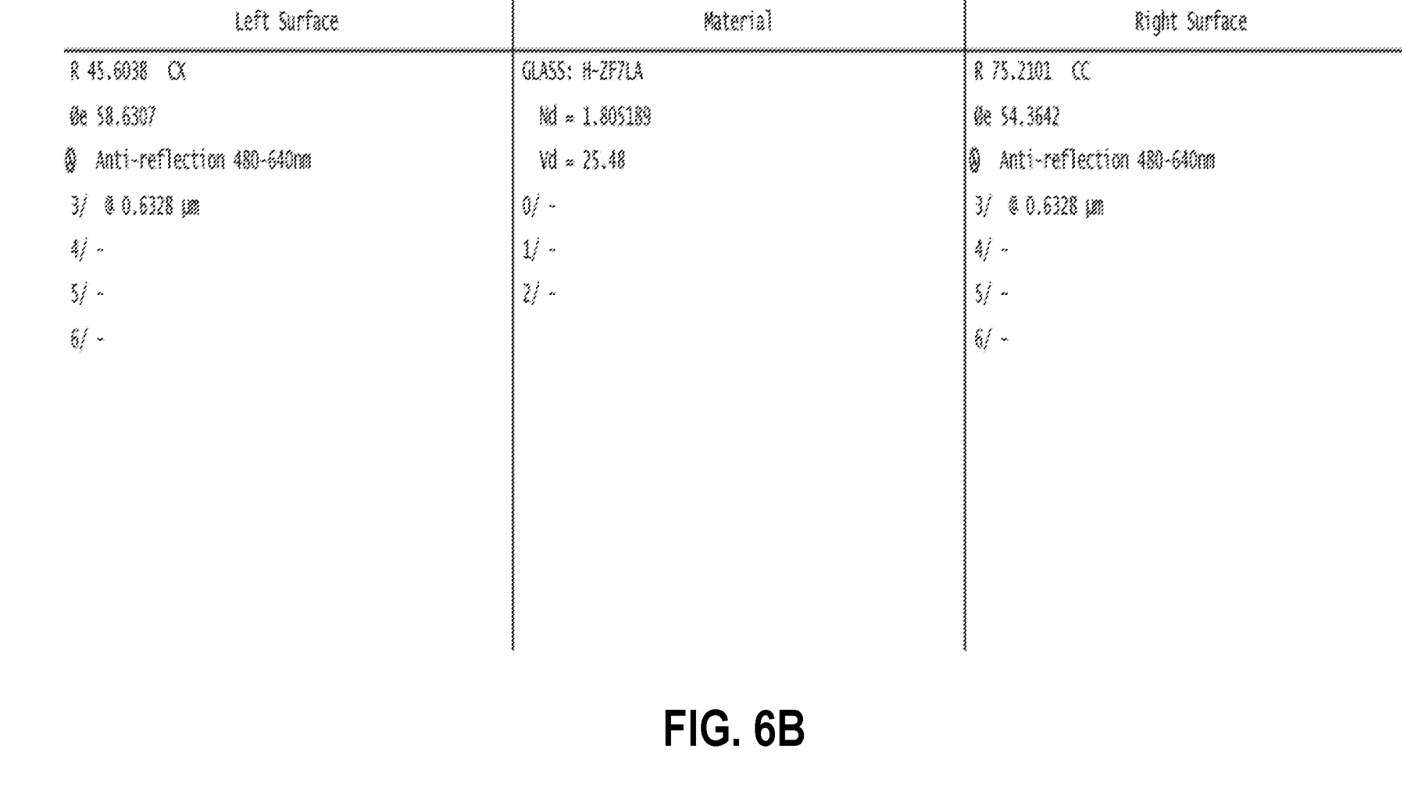
FIG. 6B depicts the left surface, material, and right surface specifications for the first underwater aberration corrector lens in accordance with ISO 10110, according to some embodiments of the present invention.

FIG. 6B depicts the left surface, material, and right surface specifications for first underwater aberration corrector lens 410 of FIG. 4 and FIG. 6A in accordance with ISO 10110, according to some embodiments of the present invention.

Figure 7A:
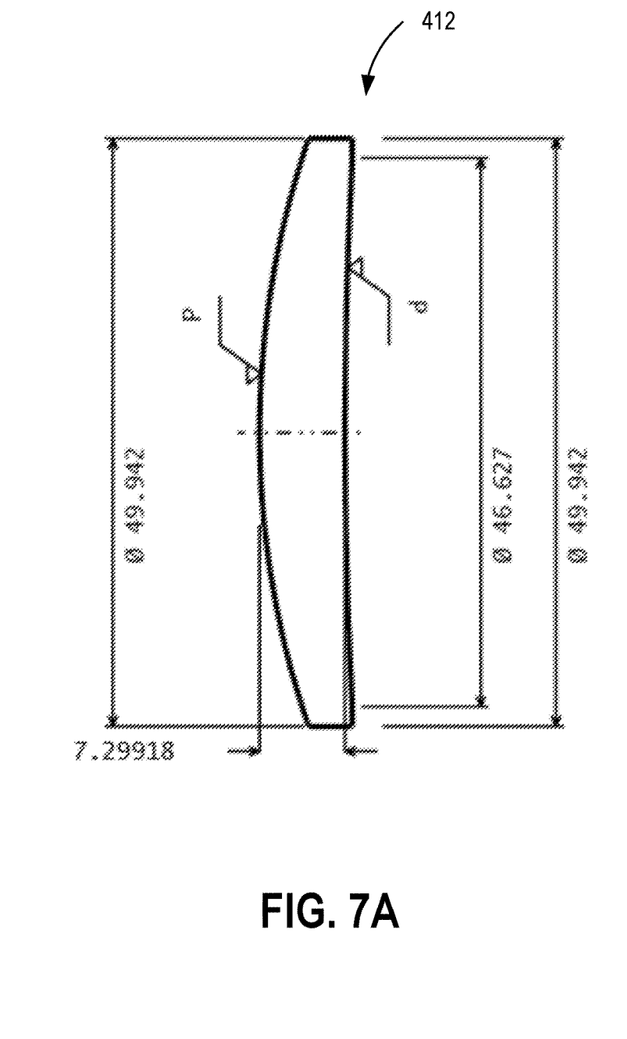
FIG. 7A depicts a second underwater aberration corrector lens of the lens barrel with element drawing indications in accordance with ISO 10110, according to some embodiments of the present invention.

FIG. 7A depicts second underwater aberration corrector lens 412 of FIG. 4 with element drawing indications in accordance with ISO 10110, according to some embodiments of the present invention. The dimensions shown are in millimeters.

Figure 7B:
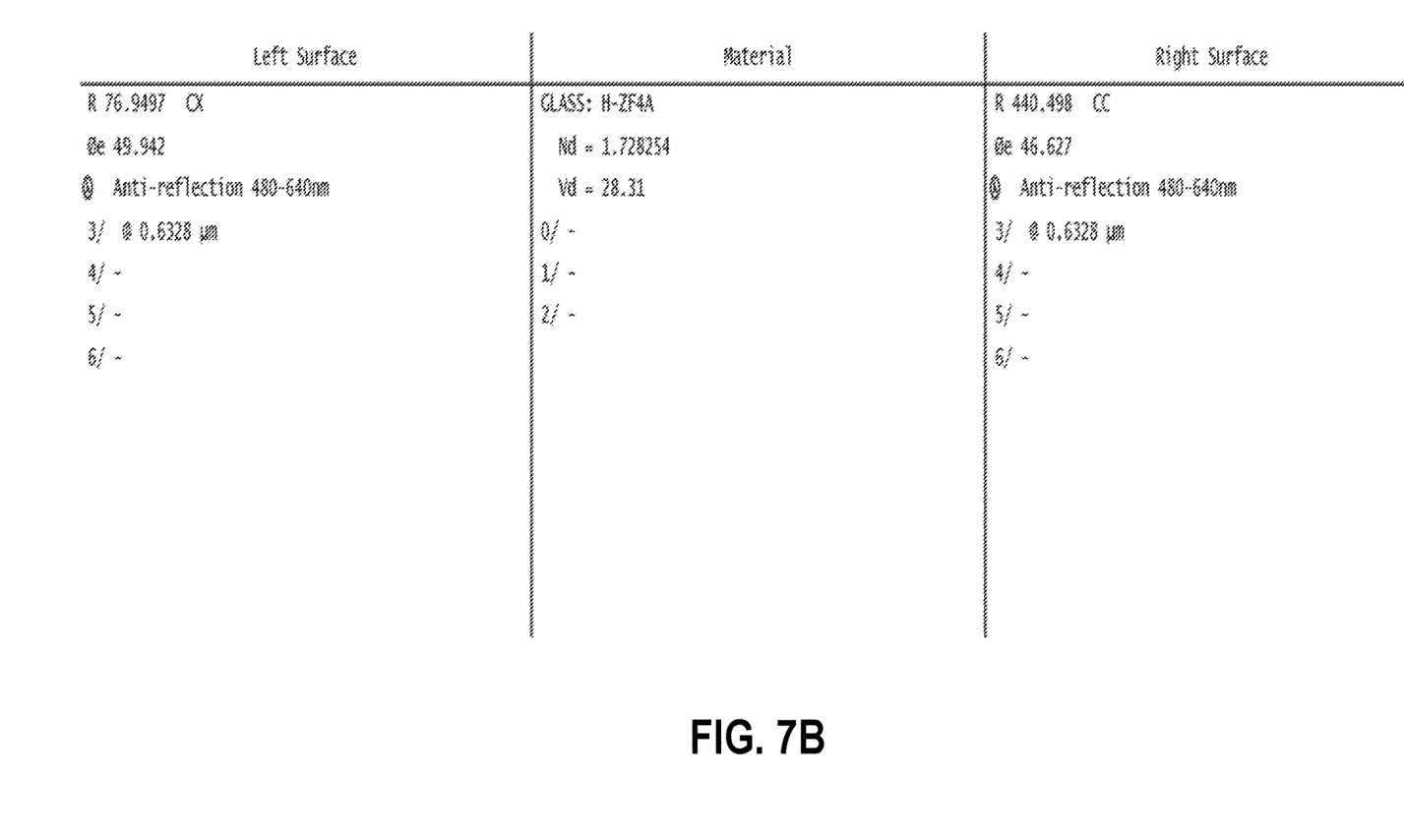
FIG. 7B depicts the left surface, material, and right surface specifications for the second underwater aberration corrector lens in accordance with ISO 10110, according to some embodiments of the present invention.

FIG. 7B depicts the left surface, material, and right surface specifications for second underwater aberration corrector lens 412 of FIG. 4 and FIG. 7A in accordance with ISO 10110, according to some embodiments of the present invention.

CONCLUSION

In the foregoing detailed description, embodiments of the present invention have been described with reference to numerous specific details that may vary from implementation to implementation. The detailed description and the figures are, accordingly, to be regarded in an illustrative rather than a restrictive sense.

A reference in the detailed description to some embodiments of the present invention is not intended to mean that embodiment(s) of the present invention is/are exclusive of other embodiment(s) of the present invention, unless the context clearly indicates otherwise. Thus, an embodiment of the present invention may be combined with one or more other embodiments of the present invention in a particular combination, unless the context clearly indicates that the embodiments are incompatible. Further, a described embodiment is intended to illustrate the present invention by an example and is not intended to limit the present invention to the described embodiment.

In the foregoing detailed description and in the appended claims, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the present invention. The first user interface and the second user interface are both user interfaces, but they are not the same user interface.

As used in the foregoing detailed description and in the appended claims, the singular forms "a," "an," and "the" are intended to include the plural forms as well, unless the context clearly indicates otherwise. As used in the foregoing detailed description and in the appended claims, the term "and/or" refers to and encompasses any and all possible combinations of one or more of the associated listed items.

As used in the foregoing detailed description in the appended claims, the terms "based on," "according to,"

"includes," "including," "comprises," and/or "comprising," specify the presence of stated features, integers, steps, operations, elements, and/or components, but do not preclude the presence or addition of one or more other features, integers, steps, operations, elements, components, and/or groups thereof.

The invention claimed is:

1. An optical system for underwater digital imaging of freely swimming fish in an aquaculture environment, the optical system comprising:
    a waterproof lens barrel comprising a corrector port affixed to a terrestrial digital camera system;
    wherein the terrestrial digital camera system comprises a terrestrial lens;
    wherein the corrector port comprises a first lens, a second lens, and a third lens arranged in a series within the corrector port in front of the terrestrial lens;
    wherein the first lens is farthest away from the terrestrial lens in the series;
    wherein the third lens is closest to the terrestrial lens in the series;
    wherein the first lens is a double concave negative lens or a negative meniscus lens providing a field of view for imaging sea lice on a whole lateral fish body side at a working distance;
    wherein the second lens is a positive meniscus lens correcting for optical aberration caused by imaging underwater;
    wherein the third lens is a positive meniscus lens correcting for optical aberration caused by imaging underwater; and
    wherein the working distance is approximately one and one-half meters.

2. A stereo optical system for underwater stereo digital imaging of freely swimming fish in an aquaculture environment, the stereo optical system comprising:
    a first waterproof lens barrel comprising a first corrector port affixed to a first terrestrial digital camera system, wherein the first terrestrial digital camera system comprises a first terrestrial lens, wherein the first corrector port comprises a first lens, a second lens, and a third lens arranged in a first series in front of the first terrestrial lens;
    a second waterproof lens barrel comprising a second corrector port affixed to a second terrestrial digital camera system, wherein the second terrestrial digital camera system comprises a second terrestrial lens, wherein the second corrector port comprises a fourth lens, a fifth lens, and a sixth lens arranged in a second series in front of the second terrestrial lens;
    wherein the first lens is farthest away from the first terrestrial lens in the first series;
    wherein the third lens is closest to the first terrestrial lens in the first series;
    wherein the first lens is a double concave negative lens or a negative meniscus lens providing a first field of view for imaging sea lice on a whole lateral fish body side at a working distance;
    wherein the second lens is a positive meniscus lens correcting for optical aberration caused by imaging underwater;
    wherein the third lens is a positive meniscus lens correcting for optical aberration caused by imaging underwater;
    wherein the fourth lens is farthest away from the second terrestrial lens in the second series;
    wherein the sixth lens is closest to the second terrestrial lens in the second series;
    wherein the fourth lens is a double concave negative lens or a negative meniscus lens providing a second field of view for imaging sea lice on a whole lateral fish body side at a working distance;
    wherein the fifth lens a positive meniscus lens correcting for optical aberration caused by imaging underwater;
    wherein the sixth lens a positive meniscus lens correcting for optical aberration caused by imaging underwater; and
    wherein the working distance is approximately one and one-half meters.

3. An optical corrector port for affixing to a terrestrial digital camera system, the terrestrial digital camera system comprising a terrestrial lens, the optical corrector port comprising:
    a first lens providing a field of view of approximately seventy-four degrees for imaging sea lice on a whole lateral fish body side at a working distance;
    a second lens correcting for optical aberration caused by imaging underwater;
    a third lens correcting for optical aberration caused by imaging underwater;
    wherein the first lens is a double concave negative lens or a negative meniscus lens;
    wherein the second lens is a positive meniscus lens;
    wherein the third lens is a positive meniscus lens;
    wherein the first lens, the second lens, and the third lens are arranged in a series within the optical corrector port such that, when the optical corrector port is affixed to the terrestrial digital camera system, the first lens is farthest away in the series from the terrestrial lens, the third lens is closest in the series to the terrestrial lens, and the second lens is between the first lens and the third lens in the series; and
    wherein the working distance is approximately one and one-half meters.

4. The optical system of claim 1, wherein the optical system optically resolves an approximately 1 millimeter in length sea louse on a fish at the working distance with an underwater modulation transfer function value of approximately 0.8 at approximately 70 lines per-millimeter for a given dark and light wavelength pair.

5. The optical system of claim 1, wherein the optical system optically resolves an approximately 1 millimeter in length sea louse on a fish at the working distance with an underwater modulation transfer function value of approximately 0.4 at approximately 150 lines per-millimeter for a given dark and light wavelength pair.

6. The stereo optical system of claim 2, wherein the optical system optically resolves an approximately 1 millimeter in length sea louse on a fish at the working distance with an underwater modulation transfer function value of approximately 0.8 at approximately 70 lines per-millimeter for a given dark and light wavelength pair.

7. The stereo optical system of claim 2, wherein the optical system optically resolves an approximately 1 millimeter in length sea louse on a fish at the working distance with an underwater modulation transfer function value of approximately 0.4 at approximately 150 lines per-millimeter for a given dark and light wavelength pair.

8. The optical corrector port of claim 3, wherein the optical corrector port optically resolves an approximately 1 millimeter in length sea louse on a fish at the working distance with an underwater modulation transfer function value of approximately 0.8 at approximately 70 lines per-millimeter for a given dark and light wavelength pair.

9. The optical corrector port of claim 3, wherein the optical corrector port optically resolves an approximately 1 millimeter in length sea louse on a fish at the working distance with an underwater modulation transfer function value of approximately 0.4 at approximately 150 lines per-millimeter for a given dark and light wavelength pair.

10. The stereo optical system of claim 2, further comprising:
   a lighting element for illuminating objects being imaged by the stereo optical system and capable of emitting a beam of light having a spectral peak in a range of approximately four hundred and fifty (450) to five hundred (500) nanometers.

11. The stereo optical system of claim 10, wherein the lighting element is capable of constantly emitting white light in a range of approximately six thousand (6,000) to ten thousand (10,000) lumens.

12. The stereo optical system of claim 10, wherein the beam of light has a beam angle of approximately seventy-five (75) degrees.

\* \* \* \* \*